(12) United States Patent
Aschauer et al.

(10) Patent No.: US 7,720,008 B2
(45) Date of Patent: May 18, 2010

(54) METHOD FOR DETERMINING A LEADING SUBSCRIBER IN A NETWORK

(75) Inventors: Rudolf Aschauer, Vienna (AT);
Christoph Dorn, Vienna (AT);
Christian Ploninger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 504 days.

(21) Appl. No.: 11/662,380

(22) PCT Filed: Aug. 12, 2005

(86) PCT No.: PCT/EP2005/053982
§ 371 (c)(1),
(2), (4) Date: Mar. 9, 2007

(87) PCT Pub. No.: WO2006/034917
PCT Pub. Date: Apr. 6, 2006

(65) Prior Publication Data
US 2008/0069001 A1    Mar. 20, 2008

(30) Foreign Application Priority Data
Sep. 27, 2004    (DE) ................. 10 2004 046 858

(51) Int. Cl.
*H04L 12/28* (2006.01)
(52) U.S. Cl. ............... 370/255; 370/461; 709/221; 709/222
(58) Field of Classification Search ......... 370/254–258, 370/461, 462; 709/220–225
See application file for complete search history.

(56) References Cited

U.S. PATENT DOCUMENTS

| 6,111,888 | A  | * | 8/2000 | Green et al. ............... 370/461 |
| 6,192,397 | B1 |   | 2/2001 | Thompson |
| 6,363,416 | B1 |   | 3/2002 | Naeimi et al. |
| 6,785,224 | B2 | * | 8/2004 | Uematsu et al. ............. 370/222 |
| 7,039,694 | B2 | * | 5/2006 | Kampe et al. ............... 709/222 |
| 7,269,648 | B1 | * | 9/2007 | Krishnan et al. ............ 709/224 |
| 2003/0041138 | A1 | * | 2/2003 | Kampe et al. ............... 709/223 |
| 2003/0140108 | A1 | * | 7/2003 | Sampathkumar ............ 709/208 |
| 2005/0160158 | A1 | * | 7/2005 | Firebaugh et al. ........... 709/223 |

\* cited by examiner

*Primary Examiner*—Jayanti K Patel
*Assistant Examiner*—Bo Hui A Zhu

(57) ABSTRACT

In one aspect, a method for determining a leading subscriber in a network consisting of a plurality of network elements, with initially the same privileges and tasks is provided. A request message is sent to all network elements, the request message being marked by a sequence number taken randomly from a first set of numbers. Request messages sent by the remaining network elements over a pre-defined period of time are receive. The sequence number transmitted during the interval is compared with the intrinsic sequence number transmitted during the first stage. If the intrinsic sequence number has the numerically highest value in comparison with all of the received sequence numbers, the network element in question is identified as the leading subscriber.

18 Claims, 2 Drawing Sheets

US 7,720,008 B2

METHOD FOR DETERMINING A LEADING SUBSCRIBER IN A NETWORK

CROSS REFERENCE TO RELATED APPLICATIONS

This application is the US National Stage of International Application No. PCT/EP2005/053982, filed Aug. 12, 2005 and claims the benefit thereof. The International Application claims the benefits of German application No. 102004046858.3 DE filed Sep. 27, 2004, both of the applications are incorporated by reference herein in their entirety.

FIELD OF INVENTION

The invention relates to a method for determining a leading subscriber or "leader" in a network consisting of an unspecified number of network elements.

BACKGROUND OF INVENTION

Networks which include equal-ranking network elements, referred to as peer-to-peer networks, are known from the prior art. Peer-to-peer networks offer equality of interworking for all connected network elements, these often being referred to as "peers" or "clients". This means that each network element can offer functions and services to other network elements and at the same time utilize functions and services offered by other systems, without making use of a central "server".

Peer-to-peer networks have become extremely widespread as a result of file exchange platforms or "file sharing systems" such as Gnutella, Napster and Kazaa, for example. These file exchange platforms have a common purpose, i.e. to allow the connected network elements to exchange data, but differ in terms of their organizational format. In the case of Napster, a reserved network element is assigned a centralized directory of the network elements currently participating in the network or the files they are offering for exchange, whereas in the case of Gnutella no provision is made for such a role of a network element holding a centralized directory. Instead, search queries or "queries" are distributed over the whole network in the form of a "multicast" query. The advantages of a decentralized embodiment of this kind are that each network element assumes an identical role and no network element is required to maintain a directory. On the other hand it has the disadvantage of a pronounced traffic volume in terms of search query messages, which volume increases disproportionately as the number of subscribers rises. The term "scaling problem" is therefore often used when referring to this disadvantage.

As a result of the cited disadvantages, in many cases it is technically advantageous to select one network element from a group of network elements which are interconnected via a network, wherein said network element assumes a leading role and is therefore designated as "leader" or leading subscriber.

SUMMARY OF INVENTION

The United States publication U.S. Pat. No. 6,192,397 B1 discloses a method wherein two subscribers each determine a random number and send this number to other subscribers. The subscriber having the higher number is subsequently designated as the leading subscriber. The method fails if the determined numbers happen to be the same.

The invention addresses the problem of specifying an improved method by means of which precisely one leading subscriber is selected in a network consisting of a plurality of network elements which initially have identical privileges and tasks.

A solution to the problem is provided by a method having the features the independent claim.

The method according to the invention is described from a perspective of a network element which, for an arbitrary reason to be explained below, assumes an active role to the effect that this network element initiates the method by sending a request message addressed to all other network elements in the network in order to determine a leading subscriber. Otherwise, the method according to the invention applies analogously to all network elements in respect of the initially identical privileges and tasks of the participating network elements, and therefore the method which is described from the perspective of the observed network element does not represent a limitation in respect of the character or selection of this observed network element. The request message which is sent to all other network elements is sent, for example, as a so-called multicast or broadcast message and contains a sequence number. This sequence number or, in anticipation of a second sequence number to be used during an embodiment of the method according to the invention, first sequence number is selected at random from a first number range, for example, in a very simple implementation, from a range of 1 to 16384. In this case a random selection or quasi-random selection also takes place by means of known technical methods on each individual network element which received the request message, and each individual network element which received the request message sends a similarly structured request message to all network elements within a predetermined period. Each of these request messages, which are sent in response to the request message that was sent by the observed network element, in turn contains a randomly selected sequence number and is therefore "marked" or "labeled" by means of this sequence number. At the observed network element—as at the other network elements—after the request messages of the other network elements have arrived within a period or "timeout" which is predetermined, i.e. can be set at the network element, the sequence numbers transferred therein are compared with the sequence number which was sent previously with the original request message. If the network element's own sequence number has a lower numerical value in comparison with one of the received sequence numbers, further participation in the method is terminated for the observed network element, meaning that the observed network element does not participate further in the further method for determining a leading subscriber and therefore continues to play the role of a network element with regard to its activities in the context of exchanged messages. If its own sequence number has the highest numerical value in comparison with all received sequence numbers, the observed network element is registered internally in the network element as the leading subscriber. The basic selection process is thus terminated and can also be notified to the other network elements by means of optional further embodiments of the invention.

Next, a further selection of a leading subscriber takes place between the responding network elements. In this case a second sequence number is added to the first sequence number and sent to the network elements which are still participating in the method. The network elements which are still participating are in this case those which responded to the first request message.

The method according to the invention has the advantage that on one hand the rather rare case may occur in which two network elements randomly choose an identical sequence number—a probability which decreases progressively as the size of the first number range increases—and therefore choosing again ensures the reliable selection of precisely one leading subscriber. On the other hand, in the course of the first selection method, the case can also occur in which the query messages that are sent in response do not arrive at the observed network element. If it was the case that these query messages contained a higher sequence number, the sending network element would have registered itself as leading subscriber, but the information concerning the presence of a higher sequence number would not have arrived at the observed network element at all, and therefore the latter—according to the first selection method—would have considered itself to be the leading subscriber and would have registered itself as such. The second selection method therefore advantageously serves to increase reliability in the intended process which ends with the selection of precisely one leading subscriber.

An essential advantage of the method according to the invention is that the described method can be implemented wholly without information about other network elements. This advantage is particularly effective when first initializing or "bootstrapping" the network.

The method according to the invention can be utilized advantageously both for initializing the network and for flexibly adapting the network in response to changed conditions. In particular, therefore, the method can be utilized for so-called ad hoc networks which are formed dependent on the situation from a local grouping of a plurality of network elements and whose local distribution and composition is subject to constant changes due to network elements being taken out of service or being added as new elements.

The method according to the invention advantageously ensures precisely one leading subscriber in a network which is formed by one broadcast segment.

Advantageous developments of the invention are specified in the dependent claims.

In an advantageous embodiment of the invention, the leading subscriber remaining after a selection process announces its attribute as leading subscriber, in order that the other network elements do not have to ascertain its attribute as leading subscriber by means of individual queries.

Two embodiment variants are proposed for determining the second sequence number. In a manner similar to the first selection method, by randomly determining the second sequence number from a second value range which is preferably selected to be smaller than the first value range for reasons of uniqueness, a simple implementation for determining the second sequence number is ensured on the basis of an approach which is similar to that used for determining the first sequence number. In a second advantageous selection method, the second sequence number, this being taken from the second number range, is selected according to specific physical parameters of the network element (i.e. the network element's own system performance and/or the available bandwidth and/or the network element's own processing capacity), thereby advantageously giving network elements having better performance characteristics a greater probability of becoming leading subscriber.

In an advantageous embodiment of the invention, the leading subscriber remaining after a selection process announces its attribute as leading subscriber, in order that the other network elements do not have to ascertain its attribute as leading subscriber by means of individual queries.

Two embodiment variants are proposed for determining the second sequence number. In a manner similar to the first selection method, by randomly determining the second sequence number from a second value range which is preferably selected to be smaller than the first value range for reasons of uniqueness, a simple implementation for determining the second sequence number is ensured on the basis of an approach which is similar to that used for determining the first sequence number. In a second advantageous selection method, the second sequence number, this being taken from the second number range, is selected according to specific physical parameters of the network element (i.e. the network element's own system performance and/or the available bandwidth and/or the network element's own processing capacity), thereby advantageously giving network elements having better performance characteristics a greater probability of becoming leading subscriber.

In a further advantageous embodiment of the invention, the method for determining the leading subscriber is preceded by a method which makes it possible to determine whether a leading subscriber already exists in the network. This essentially involves sending a query message to all network elements in the form of a multicast or broadcast message. If a confirmation message from precisely one leading subscriber arrives within a predetermined period or "timeout", the method is terminated.

If no confirmation message arrives or if a plurality of confirmation messages arrive, an initiation of the method according to the invention for determining a leading subscriber is advisable in order to ensure a single leading subscriber in the network. The latter case of a plurality of confirmation messages occurs if a plurality of leading subscribers ("multiple leaders") are present in the network. This can occur, for example, if, as a result of the dynamics inherent in this type of network, an existing leading subscriber of a first ad hoc network enters the multicast area of a second network in which a selected leading subscriber already exists. As an alternative to initiating the method according to the invention with the objective of selecting a single leading subscriber, an alternative embodiment is also advantageous in which the sequence numbers that are exchanged with the confirmation messages between the plurality of leading subscribers are compared with each other and the leading subscriber having the highest sequence number is victorious. In this case, use is advantageously made of the respective stored sequence numbers by virtue of which the respective leading subscriber became the leading subscriber as a result of the method according to the invention.

BRIEF DESCRIPTION OF THE DRAWINGS

An example including further advantages and embodiments of the invention is explained in greater detail below with reference to the drawing, in which.

DETAILED DESCRIPTION OF INVENTION

Figure 1A:
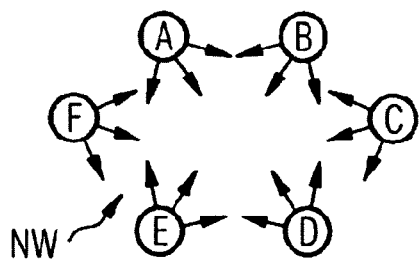
FIG. 1A-AD show structure diagrams representing individual method steps in a network which is formed from a plurality of network elements.

In the exemplary embodiments of the method according to the invention, consideration is given to a wireless ad hoc network including mobile network elements, e.g. laptops. An ad hoc network is, for example, a wireless network which has been set up without routers. The mobile network components, which communicate with each other using e.g. the WLAN (Wireless Local Area Network) communication protocol, set up the network directly as required, i.e. on an ad hoc basis. Furthermore, the ad hoc nature of the network means that the participating individual network elements a priori have no knowledge of the other network elements. Finally, an ad hoc network is not associated with a fixed number of subscribers, and therefore newly added network elements or network elements terminating the communication do not have any effect on the resources of the network. Although the method according to the invention is particularly suitable for the described network types, it is not restricted to these and can be utilized for all known LAN variants.

In principle, a method for determining a leading subscriber is required in order to achieve one of the following two states in a network:

A leading subscriber is present

There should not be more than one leading subscriber

These requirements apply similarly in mobile peer-to-peer ad hoc networks, but further restrictions and factors are relevant, such as mobility, the probability of a network element failure and limited transmission bandwidths, and achievement of the above-cited conditions is influenced by these. The resulting main differences between an ad hoc network and a wire-based network are briefly addressed below.

Technical means for wire-based networks assume that a leading subscriber has failed if it does not respond. Furthermore, most methods for selecting a leading subscriber require further information from all network elements and/or data relating to the network topology in order to assume stable conditions for the failure of a leading subscriber.

Furthermore, in the case of wire-based networks, multiple leading subscribers can only occur if a plurality of network segments merge, e.g. as a result of a previous connection error. In wireless networks, however, the reason that a leading subscriber does not respond might be that it is located too far outside the transmission range of the network or that the network has moved beyond its transmission range. Moreover, it might be the case that one observed network element does not recognize all the other observed network elements, usually due to a dynamic change in the participation of individual network elements. Participation in the network takes place dynamically, since network elements join or leave the network at times which cannot be predicted. These circumstances hamper the selection of a leading subscriber or leader. The method which is chosen for selecting a leading subscriber is complicated by this, since the topology of the network can be subject to change during the selection method. Finally, multiple leading subscribers can easily occur as a result of one leading subscriber being moved into the vicinity of another leading subscriber.

The network of the present exemplary embodiment has the following attributes:

Self-configuring, i.e. no central point or third party is used for coordinating deployment and classification of individual network elements.

Fully distributed, i.e. all network elements have access to standardized logic for carrying out the relevant tasks and for selecting a leading subscriber.

Scalable, because data exchange is performed within local domains, i.e. within the so-called broadcast or multicast domain in the present example.

Asynchronous, i.e. the processing and coordination of operations by the network elements does not require any synchronization in the form of a central clock.

The method according to the invention ensures the selection of precisely one subscriber in a broadcast segment. During the execution of the method according to the invention, three different states exist in this broadcast segment or network:

State 1: There is no leading subscriber, e.g. because the previous leading subscriber has left the network or because there are currently no communicating network elements in the network.

State 2: There is precisely one leading subscriber as a result of a successful termination of the method according to the invention.

State 3: There is more than one leading subscriber, e.g. because a leading subscriber from another network has joined the current network.

An observed network element can distinguish between two states, i.e. it can be aware of precisely one leading subscriber or that no leading subscriber exists. In the latter case, the observed network element will initiate the method according to the invention.

An embodiment of the method according to the invention consists of three steps which are processed consecutively, wherein the next step in each case is only executed if the previous step yielded no results in respect of the receipt of an address of the leading subscriber. All communication between the network elements takes place via "multicast" packets. This procedure has the advantage that it is possible to reach an observed group of network elements both for presence information messages and for messages for selecting a leading subscriber.

FIG. 1A to FIG. 1D show different stages of an exemplary selection process for a leading subscriber in a network NW consisting of six network elements A,B,C,D,E,F.

In a first step—cf. FIG. 1A—each network element A,B,C,D,E,F establishes that no leading subscriber has already been selected since the last failure of the previous leading subscriber.

This is established by means of a series of query messages which are sent at specified time intervals. In the present exemplary embodiment, a multicast transmission of three query messages, also referred to as "WhoIsServer" messages, takes place. A multiple transmission of these query messages takes place since it is not possible to guarantee the arrival at each listening network element. If a network element A having sent a query message receives a confirmation message in the form of an "IamServer" message within a predetermined period, said network element A accepts the confirming network element as the current leading subscriber and locally, i.e. for the observed network node A, terminates the method for selecting a leading subscriber. In the description of the exemplary embodiment, however, it is assumed that there is no leading subscriber in the network NW.

Figure 1B:
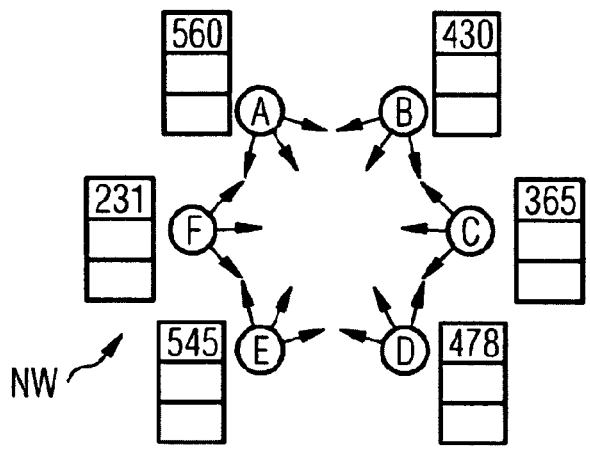

The following refers to FIG. 1B. If no confirmation message arrives within a predetermined period, request messages or "RequestForServer" messages are sent from the observed network element A as a multicast message to all network elements B,C,D,E,F in the network NW, said request message being labeled with a first sequence number which is taken at random from a first number range.

In the present case it is assumed that the first sequence number randomly determined by the observed network element A is 560, that of a second network element B is 430, that of a third network element C is 365, etc. The respective first sequence numbers of the remaining network elements D,E,F can be seen from the drawing.

The remaining network elements B, C, D, E, F likewise transmit request messages which are likewise labeled with the first sequence number as determined by said network elements in each case.

As soon as a network element receives a request message which is labeled with a sequence number that is higher than its own locally determined sequence number, this network element ceases to send further request messages and waits for a confirmation message of the type "IamServer". This applies both for the first sequence number and for the further method including higher sequence numbers as per the following FIG. 1C, etc.

Figure 1C:
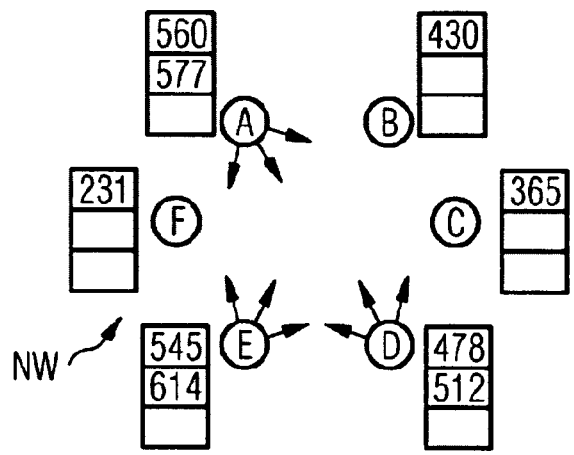

The following refers to FIG. 1C. In a second "round" of the selection process, a second request message is transmitted by the respective network element which is still participating in the selection method.

In the present case, according to the self-explanatory FIG. 1C, the network elements D and E having the first sequence numbers 478 and 545, respectively, participate in addition to the observed network element A, even though their sequence numbers are lower than that of the observed network element A and therefore they should actually refrain from sending further request messages. In the exemplary embodiment, however, it is assumed that the network elements D and E did not receive the request message of the observed network element A and also that the network element D did not receive the request message from E, and therefore they mistakenly think that they are the network element having the highest sequence number. The remaining network elements B,C have received at least one request message having a higher sequence number and have therefore discontinued their participation.

In a second selection process, second request messages are now generated. The relevant second request message concerned is labeled with a second sequence number which consists of an addition of the first sequence number and a sequence number which is randomly taken from a second number range. For example, as shown in FIG. 1C, the observed network element A has determined a second sequence number 577 which is produced by adding the first sequence number 560 to a random number 17 (not shown).

The second request message in each case is exchanged between the network elements A,D,E which are still participating in the selection method.

Figure 1D:
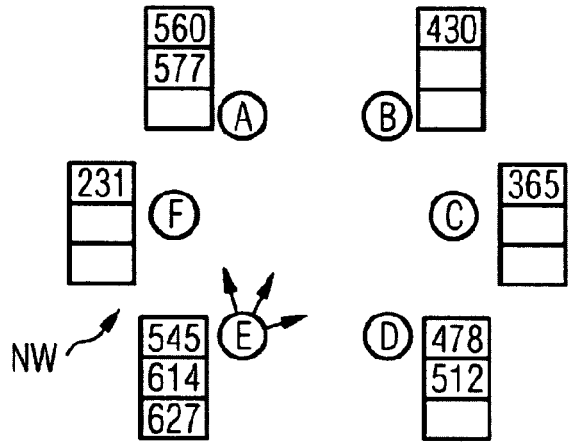

The following refers to FIG. 1D. In a third "round" of the selection process, a third request message is transmitted by the network element E which is still participating in the selection process, wherein the choice of a third sequence number having the value 627 is analogously formed by adding the second sequence number having the value 614 to a number which is randomly taken from a number range and has the value 13 (not shown). If no further request message arrives at the network element E within a predeterminable period following the transmission of this third request message, said network element E sends one or more confirmation messages of the type "IamServer" to all other network elements A,B,C,D,F in the network NW, whereupon said other network elements now register this network element E as the leading subscriber of the network NW.

A cycle of three request messages has been chosen for selection of the leading subscriber in this example, but any number of cycles can be chosen in other cases.

Figure 2:
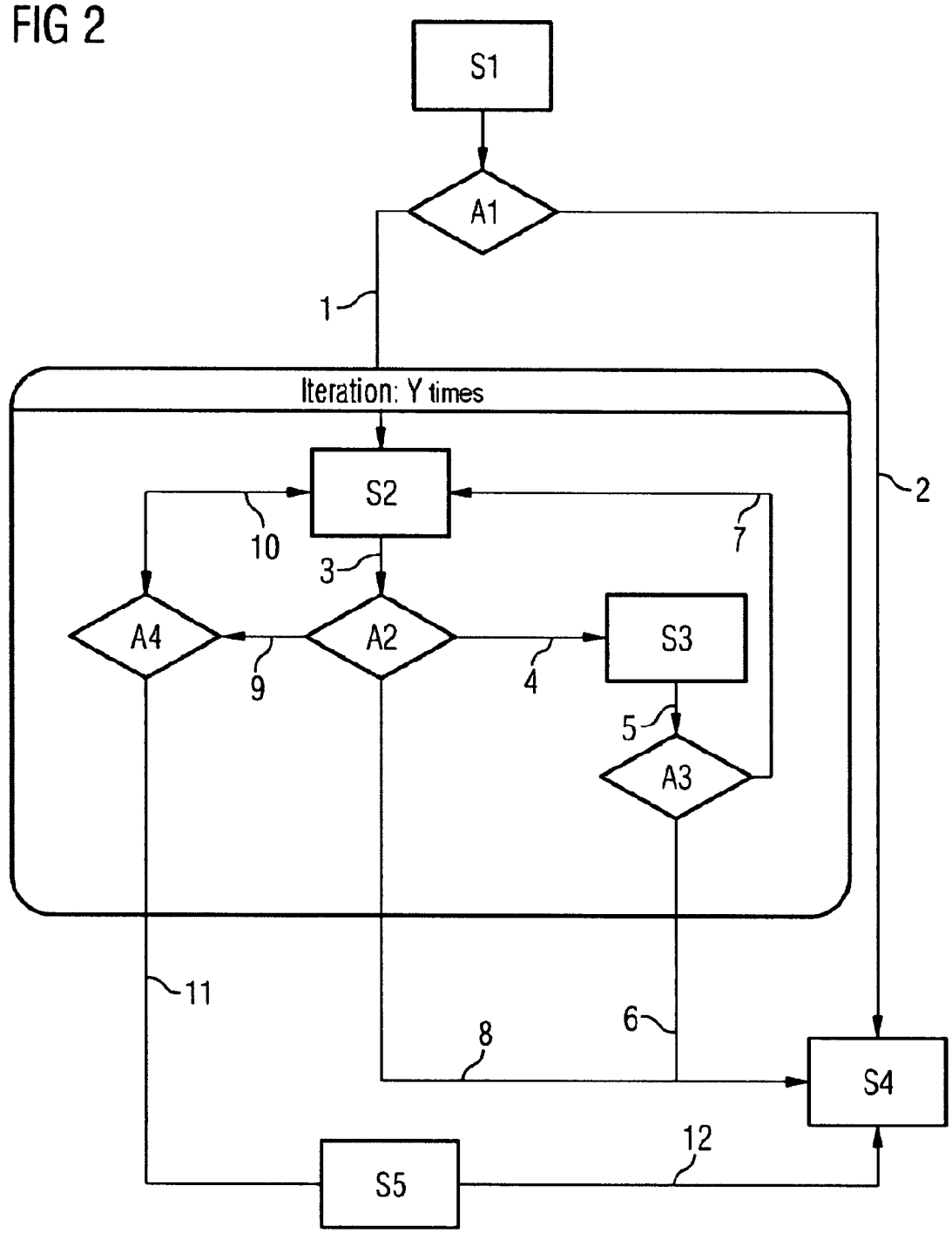
FIG. 2 shows a structure diagram which schematically represents a possible routine for selecting a leading subscriber on the basis of the method according to the invention.

FIG. 2 shows a structure diagram of an implementation example of the method according to the invention.

In a first method step S1, an observed network element initiates a transfer of a query message "WhoIsServer" which is sent as a multicast message. Since a multicast is not guaranteed to arrive at every potential recipient or network element, the query is repeated more than once, e.g. twice. The number of iterations is also at the discretion of the implementer.

After the first query message has been sent, a response is awaited for a specified period at branch step A1. If the observed network element receives an "IamServer" response within this period (method branch 2) the method is terminated for the observed network element in method step S4.

If the observed network element does not receive a response within the period (method branch 1), the first iteration starts at method step S2.

A request message is sent to all other network elements in method step S2. After the request message has been sent (method branch 3), messages from other network elements are awaited for a specified period at branch step A2.

If, within the period in branch step A2, the observed network element does not receive a request message or receives a request message having a lower sequence number than its own sequence number (method branch 9), branch step A4 is reached. If further iterations are required (method branch 10), a further request message is sent (method step S2). If no further iterations are planned (method branch 11), the observed network element sends one or more (depending on the implementation) "IamServer" messages (method step S5) and terminates the method (method branch 12, method step S4).

If the observed network element receives an "IamServer" message of another network element within the period in branch step A2, the observed network element terminates the method (method branch 8, method step S4).

If, within the period in branch step A2, the observed network element receives a request message having a higher sequence number than its own sequence number (method branch 4), no further request messages are sent by the observed network element (method step S3). Subsequently (branch step 5), the observed network element waits for a confirmation message of the type "IamServer" from another network element (branch step A3).

If, within a defined period in branch step A3, the observed network element receives a confirmation message of the type "IamServer" (method branch 6), the observed network element terminates the method (method branch 6, method step S4).

If, within a defined period in branch step A3, the observed network element does not receive a confirmation message of the type "IamServer" (method branch 7), the method is restarted (method step S2).

The invention claimed is:

1. A method for determining a leading subscriber in a network comprising a plurality of network elements, which initially have identical privileges and tasks, the method comprising the following to be carried out on a first network element:

randomly generating a first sequence number from a first number range;

sending a first request message addressed to all network elements, the first request message being labeled with the first sequence number;

receiving within a predetermined period a second request message sent by a second network element, the second request message being labeled with a second sequence number randomly generated by the second network element;

comparing the first sequence number with the second sequence number, in response to the first sequence element being a greater value:

generating a third sequence number from the first sequence number and within a second number range;

sending a third request message addressed to the second network element, the third request message being labeled with the third sequence number;

receiving within a predetermined period a fourth request message sent by the second network element, the fourth request message being labeled with a fourth sequence number generated from the second sequence number by the second network element, comparing the third sequence number with the fourth sequence number; and registering the first network element as the leading subscriber in response to the third sequence element being a greater value.

2. The method as claimed in claim 1, further comprises announcing an attribute of the first network element in a message addressed to all of the network elements in response to registering as the leading subscriber.

3. The method as claimed in claim 1, wherein the second number range is smaller than the first number range.

4. The method as claimed in claim 1, wherein the third sequence number, which is taken from the second number range, is selected at random from the second number range.

5. The method as claimed in claim 1, wherein the third sequence number, which is taken from the second number range, is selected depending on at least one criteria, the criteria selected from the group consisting of observed system performance,
available bandwidth,
observed computing capacity, and
other physical parameters.

6. The method as claimed in claim 1, further comprises determining if precisely one leading subscriber has been determined in the network prior to sending the first request message.

7. The method as claimed in claim 1, wherein the predetermined period is set at the network element.

8. The method as claimed in claim 1, wherein the network is an ad hoc network.

9. The method as claimed in claim 1, wherein the network is embodied in accordance with WLAN specifications.

10. A method for determining a leading subscriber in a network comprising a plurality of network elements, which initially have identical privileges and tasks, the method comprising the following to be carried out on a first network element:

determining if a single leading subscriber has been determined in the network prior to sending a first request message;

in response to precisely one leading subscriber being determined:

sending the first request message addressed to all network elements, the first request message being labeled with a first sequence number randomly generated from a first number range;

receiving within a predetermined period a second request message sent by a second network element, the second request message being labeled with a second sequence number randomly generated by the second network element;

comparing the first sequence number with the second sequence number;

in response to the first sequence element being a greater value:

generating a third sequence number from the first sequence number and from a second number range;

sending a third request message addressed to the second network element, the third request message being labeled with the third sequence number;

receiving within a predetermined period a fourth request message sent by the second network element, the fourth request message being labeled with a fourth sequence number generated from the second sequence number by the second network element;

comparing the third sequence number with the fourth sequence number; and registering the first network element as the leading subscriber in response to the third sequence element being a greater value.

11. The method as claimed in claim 10, wherein to determine whether the single leading subscriber has been determined the method further comprises sending to all network elements currently communicating in the network a query message for ascertaining a leading subscriber, wherein if within a predetermined period a confirmation message arrives from only one leading subscriber then the single leading subscriber has been determined; and wherein if no confirmation messages arrive then the single leading subscriber has not been determined.

12. The method as claimed in claim 11, wherein if a plurality of confirmation messages arrive then the single leading subscriber has not been determined.

13. The method as claimed in claim 11, wherein to determine a single leading subscriber the method further comprises the following for each observed leading subscriber:

comparing sequence numbers, which were transferred with the confirmation messages among the plurality of leading subscribers, wherein if confirmation messages arrive from a plurality of leading subscribers within a predetermined period, if the sequence number in an observed leading subscriber has the highest numerical value in comparison with all received sequence numbers, the observed leading subscriber is registered as the leading subscriber.

14. The method as claimed in claim 10, further comprises announcing an attribute of the first network element in a message addressed to all of the network elements in response to registering as the leading subscriber.

15. The method as claimed in claim 10, wherein the second number range is smaller than the first number range.

16. The method as claimed in claim 10, wherein the third sequence number, which is taken from the second number range, is selected at random from the second number range.

17. The method as claimed in claim 10, wherein the third sequence number, which is taken from the second number range, is selected depending at least on criteria, the criteria selected from the group consisting of observed system performance,
available bandwidth,
observed computing capacity, and
other physical parameters.

18. The method as claimed in claim 10, further comprises determining if precisely one leading subscriber has been determined in the network prior to sending the first request message.

* * * * *